United States Patent [19]

Kishimoto et al.

[11] 4,064,398
[45] Dec. 20, 1977

[54] ELECTRONIC CALCULATOR

[75] Inventors: Jyuji Kishimoto; Ichiro Sado, both of Tokyo; Yuji Sano, Kawasaki, all of Japan

[73] Assignee: Canon Kabushiki Kaisha, Tokyo, Japan

[21] Appl. No.: 559,577

[22] Filed: Mar. 18, 1975

[30] Foreign Application Priority Data

Mar. 25, 1974 Japan .................................. 49-33203

[51] Int. Cl.² .............................................. G06F 7/38
[52] U.S. Cl. ...................................................... 364/709
[58] Field of Search .......................... 235/156, 145 R; 340/172.5, 365 R

[56] References Cited

U.S. PATENT DOCUMENTS

| | | | |
|---|---|---|---|
| 3,739,161 | 6/1973 | Gross et al. | 235/156 |
| 3,863,060 | 1/1975 | Rode et al. | 235/156 |

OTHER PUBLICATIONS

Hewlett-Packard; HP-65 User's Library Catalog of Contributed Programs – Sept, 1974; pp. 4-44.

Primary Examiner—Malcolm A. Morrison
Assistant Examiner—Errol A. Krass
Attorney, Agent, or Firm—Fitzpatrick, Cella, Harper & Scinto

[57] ABSTRACT

An electronic calculator includes input means for entering numeric data, and means for discriminating between the integral and the fractional part of a mixed fraction entered by said input means. According to the electronic calculator numeric data can be entered in accordance with the fractional expression.

15 Claims, 3 Drawing Figures

FIG. 2

| | SET | RESET |
|---|---|---|
| F1 | +, −, ×, ÷, =, C | / |
| F2 | / | ÷, C |
| F3 | ÷ AT F2 SET | +, −, =, C, ÷ AT F2 RESET |

FIG. 3

| | SET | RESET |
|---|---|---|
| F1 | +, −, ×, ÷, =, C | ·, / |
| F2 | · | +, −, ×, ÷, =, C, / ( / : IF F2 RESET R1=R2 ) |
| F3 | / | +, −, ×, ÷, =, C, |

ELECTRONIC CALCULATOR

BACKGROUND OF THE INVENTION

1. Field of the Invention

This invention relates to an electronic calculator, and more particularly to an electronic calculator which can perform fractional operation through very simple manipulation.

2. Description of the Prior Art

Conventional calculators have chiefly dealt with decimal digits as input data therefor, but have involved cumbersome procedures in operating, for example, mixed fractions having integrals. Moveover, they have been liable to induce mistakes in manipulation.

For example, to enter the mixed fraction 1⅔ by means of keys, the operator had to convert 1⅔ to 5/3 by heart or by writing, whereafter the operator had to actuate keys in the order of $$\boxed{5}\boxed{\div}\boxed{3}\boxed{=}$$

to thereby obtain the result.

Also, where the expression is lengthy such as $$1\tfrac{2}{3} + 45/6 + \tfrac{7}{8} =,$$

the following operational sequence has been required.

$$\boxed{2}\boxed{\div}\boxed{3}\boxed{+}\boxed{1}\boxed{=} \rightarrow M1$$
$$\boxed{5}\boxed{\div}\boxed{6}\boxed{+}\boxed{4}\boxed{=} \rightarrow M2$$
$$\boxed{7}\boxed{\div}\boxed{8}\boxed{+}(M1) + (M2)\boxed{=}$$

where M1 and M2 are memories stored or written.

When such an operation including fractions was to be effected, the operator had to either convert the data to such a form of expression as can be entered into the calculator, or go through many complicated manipulations, to thereby obtain the result.

SUMMARY OF THE INVENTION

It is an object of the present invention to provide an electronic calculator which is improved in operability.

It is another object of the present invention to provide an electronic calculator which is easily capable of performing fractional operations.

It is still another object of the present invention to provide an electronic calculator which enables numeric data to be entered in accordance with its fractional representation.

A feature of the present invention is an electronic calculator which has means for discriminating numeric data entered in accordance with its normal written representation.

Another feature of the present invetion is an electronic calculator which can discriminate between the integral and the fractional part of any mixed fraction entered in accordance with its expression.

Other objects and features of the present invention will become apparent from the following detailed description of embodiments taken in conjunction with the accompanying drawings.

BRIEF DESCRIPTION OF THE DRAWINGS

FIG. 2 is a chart illustrating an example of the operation of flip-flops F1–F3 in FIG. 1.

FIG. 3 is a chart illustrating another example of the operation of flip-flops F1–F3 in FIG. 1.

DESCRIPTION OF THE PREFERRED EMBODIMENTS

Figure 1:
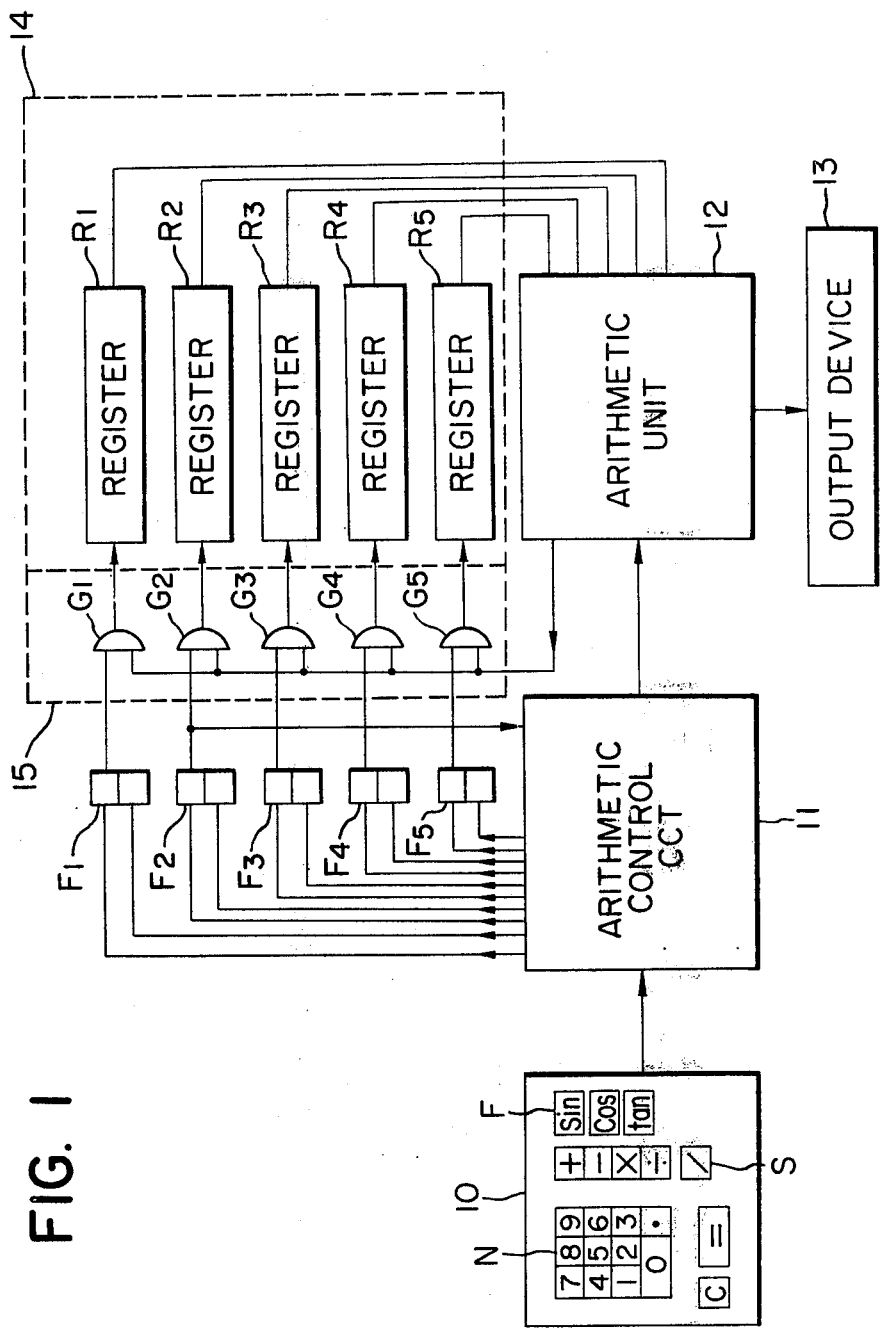
FIG. 1 is a block diagram showing an embodiment of the electronic calculator according to the present invention.

Referrng to FIG. 1, an embodiment of the electronic calculator according to the present invention is shown in a block diagram, wherein numeral 10 designates an input device including a keyboard which has a group N of conventional digit keys, a group F of conventional arithmetic operation and function operation instructing keys, a conventional clear key $\boxed{C}$, a conventional operation result calculation instructing key $\boxed{=}$, and a slant key S according to the present invention. Designated by 11 is an arithmetic control circuit for controlling fractional operation according to the present invention, and it controls set and reset of flip-flops F1–F5 and also effects various controls of an arithmetic unit 12 by storing various operating instructions ($+, -, \times, \div, /, =$, etc).

The arithmetic unit 12 chiefly comprises an adder and the like, and executes arithmetic operations under the control of the arithmetic control circuit 11. Numeral 13 denotes an output device for displaying or printing the digits entered, intermediate result and final result.

Denoted by 14 is storage means for storing the digits entered and intermediate and final results and it comprises registers R1–R5. Gate means 15 is provided for controlling data shift in the registers R1–R5 and comprises gates G1–G5 which are ON-OFF-controlled by signals from the flip-flops F1–F5.

Operation of the above-described embodiment will now be described by way of numerical examples.

EXAMPLE OF NUMERICAL EXPRESSION:

$$1\tfrac{2}{3} + 4\,5/6 + \tfrac{7}{8} = \ldots \tag{1}$$

To carry out the above fractional operation, data and instructions may be imparted from the keyboard 10 to the electronic calculator in the following sequence:

$$\boxed{1} \rightarrow \boxed{/} \rightarrow \boxed{2} \rightarrow \boxed{\div} \rightarrow \boxed{3} \rightarrow \boxed{+} \rightarrow \boxed{4} \rightarrow \boxed{/} \rightarrow \boxed{5} \rightarrow \boxed{\div} \rightarrow \boxed{6} \rightarrow$$
$$\boxed{+} \rightarrow (\boxed{/}) \boxed{7} \rightarrow \boxed{\div} \rightarrow \boxed{8} \rightarrow \boxed{=}$$

In order that operation controls may be effected by depressing the keys in the sequence indicated above, the set-reset control of the flip-flops F1–F3 may be effected as shown in the chart of FIG. 2. That is, the flip-flop F1 is set by the keys $$\boxed{+}, \boxed{-}, \boxed{\times}, \boxed{\div}, \boxed{=}, \boxed{C},$$

etc. through the operation control circuit 11, and reset by the slant key S. The flip-flop F2 is set by the slant key S and reset by the keys $\boxed{\div}$ and $\boxed{C}$. The flip-flop F3 is set by depression of the key $\boxed{\div}$ when the flip-flop F2 is set, and reset by depression of the keys $$\boxed{+}, \boxed{-}, \boxed{\times}, \boxed{=}, \boxed{C}$$

or, when the flip-flop F2 is reset, by depression of the key [=]. The flip-flop F4 and F5 are set and reset by various instructions from the operation control circuit 11 to control the opening-closing of the gates G4 and G5 and to control the shift of data such as intermediate and final results to the registers R4 and R5.

When the clear key [C] is depressed, an encoded signal corresponding to this key is generated and delivered from the input device 10 to the arithmetic control circuit 11. Such encoded signal corresponding to the clear instruction is supplied, for example, to a decoder (not shown) comprising switching elements within the arithmetic control circuit 11 suitably arranged in rows and columns to form a matrix. The operation control circuit detects from the output of the decoder indicating that the clear instruction has been applied as an input, whereupon the arithmetic control circuit generates a control signal for such instruction. The flip-flops F2 and F3 are reset by that control signal while the flip-flop F1 is set. Next, when the digit 1 is entered from the input device, a signal representing the digit 1 is stored in the register R1 through the gate G1 since the flip-flop F1 has been set. Subsequently, upon depression of the slant key S, detection is effected in the operation control circuit 11 in the same manner as previously described, and upon such detection, the flip-flop F1 is reset while the flip-flop F2 is set. The fact that the slant key S has been depressed is stored in a storage element (not shown) such as, for example, a flip-flop, within the arithmetic control circuit 11.

Thus, a signal representing the second digit 2 enters the register R2 through the gate G2. By the key [−], the flip-flop F2 is reset while the flip-flop F3 is set, so that a signal representing the next digit 3 enters the register R3 through the gate G3. Thus, up to this stage, the signals representing the digits 1, 2 and 3 are stored in the registers R1, R2 and R3, respectively. When the key [+] is now depressed, the operation R2 ÷ R3 + R1 is executed in the arithmetic unit 12 under the control of the instructions from the slant key S and the division key[÷] so far stored in the arithmetic control circuit 11. By a signal representing the completion of such operation, the flip-flop F4 is set and the result of the operation is passed through the gate G4 to the register R4 for storage therein. At the same time, the addition operating instruction (+) is stored in the arithmetic control circuit 11 in the same manner as described. Through similar operations, signals representing the digits 4, 5 and 6 are stored in the registers R1, R2 and R3, respectively, while the signals representing 1, 2 and 3 so far stored in these registers are cleared therefrom. Next, by depression of the key[+], the operation R2 ÷ R3 + R1 is executed and the result thereof is stored in one of the registers R1, R2 and R3. Further, in accordance with and under the control of the add instruction (+) so far stored in the control circuit 11, the result 4 5/6 stored in one of the registers R1, R2 and R3 and the result 1⅔ stored in the register R4 are treated for addition in the operating circuit 12, and the result of the addition 1⅔ + 4 5/6 is passed through the gate G5 to the register R5 for storage therein because the flip flop F5 is set by a control signal derived from the operation control circuit 11 in the same manner as described. Next, the flip-flop F2 is again set by the slant key S so that a signal representing the digit 7 enters the register R2 while a signal representing the digit 8 enters the register R3, whereafter by depression of the key [=] the operation R2 ÷ R3 + R1 (where R1=0) is executed in the arithmetic unit 12 in the same manner as described, and the result of such operation is stored in one of the registers R1, R2, R3 and R4, whereafter this result and the intermediate result 1⅔ + 4 5/6 in the register R5 are treated for addition, and then the final result 1⅔ + 4 5/6 + ⅞ is stored in one of the registers R1–R5 and displayed or printed by the output device 13.

In the present example, since ⅞ is a fraction having no integral, it follows the rule of FIG. 2 even if the slant key S is not depressed, and thus no wrong operation occurs. Of course, no inconvenience will be experienced if the slant key S is depressed. Further, in the present example of expression, the successive display or printing of the result 1⅔ + 4 5/6 may easily be accomplished by a known technique. Also, there is known an operating system whereby bracket keys [(] and [)] are additionally used to effect key operations in a sequence following the numerical expression in question, and to obtain the result of the expression. If the numerical expression (1) indicated above is to be operated by such an operating system, the operations may occur in the manner as shown just below.

[(][1][+][2][÷][3][)][+][(][4][+][5]
[÷][6][)][+][7][÷][8][=]

This will require key depressions to be more frequent by three to four times than required in the present invention, and as the numerical expression is longer or the number of the expressions to be operated on is greater, it will encounter disadvantages in that it induces fatigue of the operator as well wrong entries. In contrast, the present invention also has an advantage that a lesser frequency of key depressions is required.

Further, with the present embodiment, entry is still feasible in the case where denominator and numerator include decimals, such as 1(2·2/3·3). This may be accomplished by effecting input key operations in the sequence of

[1]→[/]→[2]→[.]→[2]→[÷]→[3]→[.]→[3].

The foregoing embodiment is designed such that any mixed fraction is divided into an integral and a fractional part, and these are discriminated by the calculator. The second and third embodiments to be described hereinafter are such that an integral and a fractional part are distinguished from each other by a decimal point key and only the fractional part is subjected to division.

FIG. 3 is used to execute an expression shown below.

$$1\tfrac{2}{3} \div 4\,5/6 + \tfrac{7}{8} = \ldots \tag{2}$$

The expression (2) may be entered, operated and controlled by the following key operations.

[1]→[.]→[2]→[/]→[3]→[÷]→[4]→[.]→
[5]→[/]→[6]→[+]→[7]→[/]→[8]→[=]

In this case, the conditions for set and reset of the flip-flops F1–F3 are defined as shown in FIG. 3. More specifically, the flip-flop F1 is set by the keys

[+], [−], [×], [÷], [=] and [C]

and reset by the keys [.] and [/].

The flip-flop F2 is set by the key [.] and reset by the keys [+], [−], [×], [÷], [=], [C] and [/].

However, if the flip-flop F2 has already been reset immediately before they key [/] is depressed, the control circuit 11 will operate such that the content of the register R1 is shifted to the register R2 while, at the same time, the content of the register R1 is cleared and nullified. This is done because the expression entered is not a mixed fraction and so, the content of the register R1 must be nullified and the register R2 must store the numerical value of the numerator. Further, the flip-flop F3 is reset by the keys

[+], [−], [×], [÷], [=] and [C].

The flip-flops F4 and F5 are set and reset under the control of the control circuit 11 in the same manner as described with respect to the previous example, so as to control the data shift to the result storing registers R4 and R5.

In the same manner as in the previous example, the flip-flop F1 is set by the clear key [C] and the flip-flops F2 and F3 are reset. When a digit 1 is entered, a signal representing the digit 1 is passed through the gate G1 to the register R1 for storage therein. Next, by a decimal point key [.], the flip-flop F2 is set while the flip-flop F1 is reset, so that a signal representing the next digit 2 is passed through the gate G2 to the register R2 for storage therein. Subsequently, by the slant key S, the flip-flop F2 is rest while the flip-flop F3 is set, so that a signal representing the next digit 3 is passed through the gate G3 to the register R3 for storage therein. By the key [÷], the flip-flop F3 is reset while the flip-flop F1 is set and at the same time, the operating circuit 12 executes the operation R2 ÷ R3 + R1, the result of which 1⅔ sets the flip-flop F4 under the control of the control circuit 11 to open the gate G4 to permit the register R4 to store the result therein. Under similar control, digits 4, 5 and 6 are stored in the registers R1, R2, and R3, respectively. At this time, the digits 1, 2 and 3 so far stored in these registers are cleared. Alternatively, as described previously, the clearance may be effected as soon as those digits become unnecessary and, instead of using the register R4 to store the intermediate result 1⅔, one of the registers R1–R3 may be used to store such intermediate result. This also holds true with Embodiment 1. Subsequently, by the key [÷], the operating circuit 12 again executes the operation R2 ÷ R3 + R1, the result of which 4 5/6 is stored in one of the registers R1 – R3. Upon the depression of the key [÷], an add instruction is also stored in the arithmetic control circuit 11 in the same manner as described previously. Further, upon the depression of the key [÷] the divide instruction stored in the arithmetic control circuit 11 (i.e., the divide instruction after the digit 3 has been entered) is executed, and the divider 4 5/6 stored in one of the registers R1 – R3) is used to execute the division, in the arithmetic unit, under the control of the arithmetic control circuit 11. The result of 1⅔ ÷ 4 5/6 is stored in the register R5. Next, digit 7 is stored in the register R1 under the same control as described, and then shifted to the register R2 by the slant key S while the content of the register R1 is cleared. Digit 8 is stored in the register R3 under similar control and, upon depression of the key [÷], the operation R2 ÷ R3 + R1 (where R1=0) is executed in the arithmetic unit 12. The result of this is stored in one of the registers R1 - R4, whereafter this content and the intermediate result 1⅔ ÷ 4 5/6 stored in the register R5 are treated for addition in the operating circuit 12 by the add instruction (+) stored in the arithmetic control circuit 11. The final result of 1⅔ ÷ 4 5/6 + ⅞ is stored in one of the registers R1 - R5 and displayed or printed by the output device 13.

In this Embodiment 2, even a number in which only the denominator of a fraction has a decimal fraction (for example, such as 1(2/3·3) ) may be entered in accordance with the written expression. This is because, in the case of 1(2/3·3), the first depression of the decimal point key has the significance of making a distinction between the integral 1 and the fractional part (2/3·3). The decimal point key after the depression of the slant key, no longer has such significance and may be used as an ordinary decimal point. However, in the case of a number in which the numerator has a decimal point, it is obvious that the conditions shown in FIG. 3 do not enable two successive depressions of the decimal point key to be distinguished in significance from each other. Nevertheless, it will be apparent that such distinction could be made if conditions were changed.

In both of the Embodiments 1 and 2, however, calculation of ordinary expressions other than fractional expressions may be done without the necessity of taking into account numbers having decimal points. For example, when the rule of Embodiment 2 (corresponding to the chart of FIG. 3) is followed, calculation of the expression 1.2 ÷ 3.4 = may be accomplished simply by depressing the keys

[1], [.], [2], [÷], [3], [.], [4] and [=]

in the named order. More specifically, when the key [1] is depressed, the flip-flop F1 is set, whereby digit 1 is stored in the register R1 through the gate G1, and next, by depression of the decimal point key [.], the flip-flop F1 is reset while the flip-flop F2 is set, so that digit 2 is stored in the register R2 through the gate G2. Up to this stage, operation is identical with that described with respect to Embodiment 2. Subsequently, the divide instruction key [÷], instead of the slant key [/] is depressed so that the flip-flop F2 is reset while the flip-flop F1 is set. At the same time, the operation R1(1) + R2(0.2) is executed by the arithmetic unit 12 under the control of the control circuit 11, the result of which operation is stored in the register R4. That is, by confirming that the keys

[+], [−], [×], [÷], [=], etc. other than the slant key [/] have been depressed when flip-flop F2 is set, it can be determined that the content of the register R2 corresponds to data to the right of the decimal point, and control may thereupon be effected by the arithmetic control circuit 11 so that the addition of the data left of the decimal point stored in the register R1, and the data right of the decimal point stored in the register R2, is executed.

Subsequently, digits 3 and 4 are stored in the registers R1 and R2 in the same manner as described above, R1(3) + R2(0.4) is executed, and the result thereof is stored in the register R5, whereafter R4(1.2) ÷ R5(3.4) is executed by the arithmetic unit 12. There is thus obtained the answer (quotient) of the division.

In Embodiment 2, a fraction ⅔ was entered by depressing the keys $$\boxed{2}, \boxed{/} \text{ and } \boxed{3}$$

in the named order, and this usually signifies 2 ÷ 3 and is a natural sequence of digit key entries. However, in view of the fact that not a few people write a fractional expression by writing a denominator at first and then a numerator, it would advantageously increase the flexibility of the calculator if it is designed such that the desired operation can be accomplished even by depressing the keys $$\boxed{3}, \boxed{/} \text{ and } \boxed{2}$$

in the named order. Embodiment 3 pertains to such a case, and the expression (2) in Embodiment 2 may be entered, calculated and controlled by the following sequence of key operations.

$$\boxed{1} \to \boxed{.} \to \boxed{3} \to \boxed{/} \to \boxed{2} \to \boxed{+} \to \boxed{4} \to \boxed{.} \to$$
$$\boxed{6} \to \boxed{/} \to \boxed{5} \to \boxed{+} \to \boxed{8} \to \boxed{/} \to \boxed{7} \boxed{=}$$

Digit 1 is stored in the register R1 through the gate G1 in the manner as already described. By depression of the decimal point key ☐ the flip-flop F2 is set while the flip-flop F1 is reset, so that digit 3 enters the register R2 through the gate G2. Next, by the depression of the slant key ☐, the flip-flop F2 is reset while the flip-flop F3 is set, so that digit 2 is stored in the register R3 through the gate G3. Subsequently, by depression of the add instructing key ☐, the flip-flop F1 is set while the flip-flop F3 is reset, whereby the arithmetic control circuit 11 controls the arithmetic unit 12 to execute the operation R3(2) ÷ R2(3) + R1(1). Such control may be accomplished simply by interchanging R2 and R3 in the arithmetic control of Embodiment 2 for R2 ÷ R3 + R1, and by slightly reforming the arithmetic control circuit 11 but without changing the condition chart of FIG. 3. Subsequently, digits 4, 5 and 6 are stored in the registers R1, R3 and R2, respectively, whereafter R3 ÷ R2 + R1 is executed by the key ☐, result of which 4 5/6 and the result 1⅔ stored in the register R4 are treated for addition, and the result of the addition 1⅔ + 4 5/6 is stored in the register R5. Next, digit 8 is likewise stored in the register R1, but this numerical content 8 is shifted to the register R2 by the next successive depression of the slant key ☐. At the same time, the numerical content 8 in the register R1 is cleared. Subsequently, digit 7 is likewise stored in the register R3, whereafter by depression of the key ☐, operation R3 ÷ R2 + R1 (where R1=0) is executed and the content of the register R5 is added to the result of said operation, whereby the final result may be obtained. In this way, Embodiment 3 may easily be realized simply by causing the arithmetic control circuit 11 to effect a control wherein R2 and R3 are interchanged in the operation control of Embodiment 2 for R2 ÷ R3 + R1.

Thus, according to the present invention, means are provided for discriminating between fractional operations when a calculator effects operation of an expression including fractional expressions, whereby operation of any expression including fractions may be accomplished by easy manipulation.

The present invention is applicable not only to the above-indicated examples of expression (1) and (2), but also to all the other forms of expressions such as A × B + C = (3), A ÷ B × C ÷ D ÷ D ÷ E = (4), A + B × C = (5), A − B ÷ C = (6), etc., and when A to E in these expressions are mixed fractions, operations may of course be effected by entering them in their forms as shown. However, in case of Examples (3) and (4), the key depressions may take place in the sequence as shown there, whereas in case of Examples (5) and (6), arithmetic control must be effected either by the internal control circuit in accordance with a rule that multiplication and division be executed prior to addition and subtraction, or arithmetic control must be accomplished by the use of bracket keys ☐ and ☐, as has conventionally been done. This may easily be accomplished by well-known techniques. Also, in case of a form wherein successive operational treatments follow key depressions prior to depression of the key ☐, the rule that the instructions earlier entered should be earlier executed must of course by obeyed. In case of a form wherein all operations are executed and treated after depression of the key ☐, it is unexceptional even with the present invention that operations must take place in accordance with the rules that first priority should be given to brackets, then multiplication and division, and other input instruction.

It will be apparent that the present invention is also applicable to electronic desk top calculators capable of effecting function operations using trigonometric functions, hyperbolic function, etc., if the sequence of key actuations such as $$\boxed{\sin} \to \boxed{1} \to \boxed{.} \to \boxed{2} \to \boxed{/} \to \boxed{3}$$

is obeyed.

We claim:

1. An electronic calculator comprising:
   input means having a keyboard for entering numeric data;
   instruction means for developing a signal to instruct distinction between integral and fractional parts of a mixed fraction in the numeric data wherein the fractional part is to be entered from said keyboard in the form of a fraction;
   control means responsive to the signal from said instruction means for generating control signals to control an arithmetic operation associated with the numeric data comprising the mixed fraction;
   discriminating means for discriminating between the integral and fractional parts of the mixed fraction according to the control signals from said control means; and
   means for processing the integral and fractional parts discriminated by said discriminating means.

2. An electronic calculator according to claim 1 wherein said instruction means include a keyswitch.

3. An electronic calculator comprising:
   a keyboard for entering numeric data;

a plurality of registers for storing the numeric data therein;

an operation control circuit for generatng signals to control an operation associated with the numeric data comprising integral and fractional parts of a mixed fraction;

means for discriminating between the integral and fractional parts entered from said keyboard to cause them to be stored in specified registers of said plurality of registers in accordance with the control signals from said operation control circuit.

4. An electronic calculator comprising:

input means having numeral keys for entering numeric data and a plurality of function keys for instructing arithmetic operation;

first instruction means for developing a signal to instruct the distinction between integral and fractional parts of a mixed fraction in the numeric data;

second instruction means for developing a signal to instruct the distinction between the numerator and the denominator of the mixed fraction in cooperation with said first instruction means; and operation control means responsive to the instruction signals from said first and second instruction means for generating control signals to control the operation associated with the numeric data comprising the mixed fraction.

5. An electronic calculator according to claim 4 wherein said first instruction means serve to instruct the distinction between the integral and fractional parts of the mixed fraction when cooperating with the second instruction means, and serve as means for entering decimal point information when not cooperating with the second instruction means.

6. An electronic calculator according to claim 4 wherein said fist instruction means has a keyswitch.

7. An electronic calculator according to claim 4 wherein said second instruction means has a keyswitch.

8. An electronic calculator according to claim 4 wherein said second instruction means is to be depressed after the denominator is entered from said numeric key.

9. An electronic calculator comprising:

a keyboard having numeric keys for entering numeric data and a plurality of function keys for instructing arithmetic operations to be performed on the entered data;

an instruction key for providing a signal to distinguish between integral and fractional parts of a mixed fraction in the numeric data to be entered from said keyboard;

an operation control circuit for generating signals to control said arithmetic operations associated with the numeric data including the integral and fractional parts;

a plurality of registers, each of which is operative to selectively store entered numeric data therein; and means coupled to said control circuit and said registers for discriminating between the integral and fractional parts entered from said keyboard to cause said parts to be stored in specified registers of said plurality of registers in accordance with the control signals from said operation circuit.

10. An electronic calculator comprising:

input means for entering numeric data;

first discriminating means for discriminating between integral and fractional parts of a mixed fraction entered from said input means;

second discriminating means for discriminating between the numerator and denominator of the fractional part of the mixed fraction; and means for processing the integral part and the fractional part including the numerator ànd denominator discriminated by said first and second discriminating means.

11. An electronic calculator according to claim 10, further comprising an instruction key for providing a signal to distinguish between integral and fractional parts of said mixed fraction, wherein said first discriminating means is operable in response to said signal.

12. An electronic calculator comprising:

input means for entering numeric data;

means for discriminating between integral and fractional components of mixed numbers entered from said input means wherein the fractional components are entered in the form of fractions comprising numerators and denominators, and for producing corresponding output signals; and means coupled to said discrimination means and responsive to said output signals for processing said numeric data wherein operations are selectively performed on each of said integral components, said numerators and said denominators.

13. An electronic calculator according to claim 12 further comprising:

instruction means for developing a signal to instruct the distinction between the integral and fractional parts of the mixed fraction in the numeric data, and for enabling said discriminating means.

14. An electronic calculator according to claim 12, further comprising an instruction key for providing a signal to instruct the distinction between integral and fractional parts of said mixed fraction, wherein said discriminating means is operable in response to said signal.

15. An electronic calculator of the type wherein arithmetic operations are performed on mixed numbers entered therein, said calculator comprising:

input means wherein operation instructions and integral, numerator and denominator components of said numbers are entered for generating respective signals corresponding thereto, said input means comprising discrimination means wherein information is entered to identify the respective entry of said integral, said numerator and said denominator components for generating discriminating signals corresponding thereto;

arithmetic control means coupled to said input means and including an arithmetic unit, said control means being responsive to said operation instructions for computing corresponding results;

means coupled to said control means and responsive to said discrimination signals for storing said integral, said numerator and said denominator signals, and for selectively entering said signals into said arithmetic unit in response to said operation instructions; and output means coupled to said arithmetic unit for visually displaying the results computed by said control means.

* * * * *

UNITED STATES PATENT AND TRADEMARK OFFICE
CERTIFICATE OF CORRECTION

PATENT NO. : 4,064,398
DATED : December 20, 1977
INVENTOR(S) : JYUJI KISHIMOTO, YUJI SANO, ICHIRO SADO It is certified that error appears in the above-identified patent and that said Letters Patent are hereby corrected as shown below:

Column 5, line 11, delete "they" and insert --the--;

line 36, delete "rest" and insert --reset--.

Signed and Sealed this

Second Day of May 1978

[SEAL]

Attest:

RUTH C. MASON
Attesting Officer

LUTRELLE F. PARKER
Acting Commissioner of Patents and Trademarks